United States Patent [19]

Yang

[11] Patent Number: 4,678,162

[45] Date of Patent: Jul. 7, 1987

[54] JACK HAVING THE PNEUMATIC AIR PUMP FUNCTIONS AND USING A COMMON DRIVE MOTOR

[76] Inventor: Tai-Her Yang, 5-1 Taipin St., Si-Hu Town, Dzan-Hwa, Taiwan

[21] Appl. No.: 791,503

[22] Filed: Oct. 25, 1985

[51] Int. Cl.[4] .................... B60P 1/48; B66F 3/24

[52] U.S. Cl. .................... 259/8 B; 254/93 H; 254/1

[58] Field of Search .................... 254/93 R, 93 H, 423, 254/1, 89 M, 418, DIG. 2, 8 B; 7/100; 91/4 R; 74/15.6, 15.63

[56] References Cited

U.S. PATENT DOCUMENTS

| | | | |
|---|---|---|---|
| 1,983,444 | 12/1934 | Dry | 254/423 |
| 2,034,605 | 3/1936 | Carman | 259/93 H |
| 2,458,590 | 1/1949 | Harris et al. | 254/DIG. 2 |
| 2,575,485 | 11/1951 | Bramble | 254/8 B |
| 3,181,836 | 5/1965 | Arnes et al. | 254/8 B |
| 3,828,878 | 8/1974 | Clapsaddle | 74/15.63 |
| 4,057,114 | 11/1977 | Anderson | 74/15.63 |
| 4,289,298 | 9/1981 | Kameda | 254/8 B |

*Primary Examiner*—Robert C. Watson
*Attorney, Agent, or Firm*—Leonard Bloom

[57] ABSTRACT

A hydraulic floor jack is disclosed which is adapted for the tasks of lifting a vehicle and pumping up a tire. The jack is provided with a common drive motor including an elongated double-ended shaft having respective end portions projecting from the motor. The one end of the shaft is connected to and drives a piston of an air pump. The other end of the shaft is connected to a second reduction gearing which, in turn, drives an oil pump including a drive rod and a lifting mechanism including a pivoted arm set driven by the drive rod.

1 Claim, 17 Drawing Figures

JACK HAVING THE PNEUMATIC AIR PUMP FUNCTIONS AND USING A COMMON DRIVE MOTOR

BACKGROUND OF THE INVENTION

Conventional vehicular accessories respectively include an air pump and lifting jack. These accessories are troublesome in that they often jam (occupy much space) in the luggage compartment. This design uses a common drive motor as the drive element of the original air pump and the jack, in order to pump air into the tire and to place the jack into motion. Use of this common motor and the associated mechanisms make the costs thereof lower, the structure thereof is simplified, and the required space therefor is reduced while achieving the dual functional effect.

SUMMARY OF THE INVENTION

Generally, vehicles often are equipped with a wide variety of the vehicular affiliated tools such as a jack, and a tire air pump, etc., for drivers to conduct the repair and maintenance jobs themselves during the emergency situations whenever common troubles like tire punctures take place. However, the great number of these accessory tools often fill and jam the luggage compartment occupying a large amount of space in the car. Additionally, the costs to buy these items form a burden to the vehicle owners. Therefore, to solve these problems the present invention designs a compound tool with multiple functions which are driven by a common motor.

In accordance with the teachings of the present invention, there is disclosed a hydraulic floor jack adapted for the tasks of lifting a vehicle and pumping up a tire, respectively. This jack has a housing. A common drive motor is positioned in the housing. The motor includes an elongated double-ended shaft having respective end portions projecting from the motor. An air pump is positioned on the housing and includes a piston connected to one of the end portions of the motor shaft. Reduction gearing is driven by the other end portion of the motor shaft. An oil pump is provided including a crank driven by the reduction gearing. An oil pressure tank is driven by the oil pump and includes a drive rod. A lifting mechanism is provided including a pivoted arm set driven by the drive rod. A pivoted upper arm is coupled to the arm set and includes a supporting block for lifting a vehicle. Finally, drain control means is provided for the air pump and oil pump, respectively.

BRIEF DESCRIPTION OF THE DRAWINGS

FIG. 1-1 is a view of an example of a lengthway adjustment-type jack having the air pump functions both of which are driven using the common motor.

FIG. 1-2 is a view of an example of a sideway adjustment-type jack having the air pump functions both of which are driven using the common motor.

FIG. 1-3A is a view of an example of an electromagnetic clutch-operated jack having the air pump functions both of which are driven using the common motor.

FIG. 1-3B is a view of a mechanical clutch-operated jack having the air pump functions both of which are driven using the common motor.

FIG. 2-1 is a front view of a coaxially-coupled stand type jack and air pump.

FIGS. 2-2 and 2-3 are side views of a coaxially-coupled stand type jack and air pump.

FIG. 2-4 is a side view in cross-section of a hydraulic floor jack having a coaxially coupled jack and air pump.

FIG. 2-5 is a top plan view of the coaxially-coupled jack and air pump.

FIG. 2-6 is a rear view of the coaxially-coupled jack and air pump.

FIG. 2-7 is a view of a coaxially-coupled pump and jack having a mechanical clutch operation.

FIGS. 2-8, 2-9, 2-10 of the coaxially-coupled type pump and guide rod driven jack.

FIG. 3 is another view of the separate jack and the air pump functions driven by the common motor removed from the jack.

FIG. 4 is a circuit diagram of the example with the functions of the AC/DC air pump, jack and charger.

DETAILED DESCRIPTION OF THE INVENTION

In general, most vehicular jacks are of the manual type. In recent years, the jacks directly driven by the electric supply of a vehicle have been marketed to help the people repair vehicles with troubles. Similarly, an electrical air pump to inflate the tires of an automobile have also been provided to lend assistance to people in need thereof. Unavoidably the above-said two electrical tools are costlier than the conventional manual ones. This is due in part to the expense of drive motors incorporated herewith. However, the opportunity to commonly use these two tools occurs often, for instance, when a tire punctures, the jack has to be used to jack up the car body to change the flat tires and to pump the air into the replaced tires. The present invention provides a jack having an air pump that functions using a common drive motor. Use of a common motor can reduce the costs required and in such instances the air pump and the jack are an integral structure which occupies a smaller space and thus is easier to carry and use. The main feature of this design lies in that a single drive motor produces the multiple functions of driving an air pump and the jack lift. Based on this principle, various mutual comparable structures are as follows:

A. Multi-axial coupling separate operating type

Figure 1:
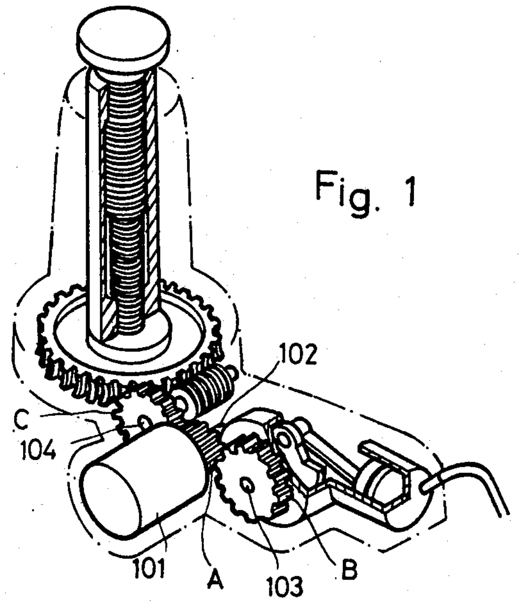
FIG. 1 is a view of an example of a multiaxial coupled and separately operated jack having the air pump functions both of which are driven using the common motor.
Figure 1:
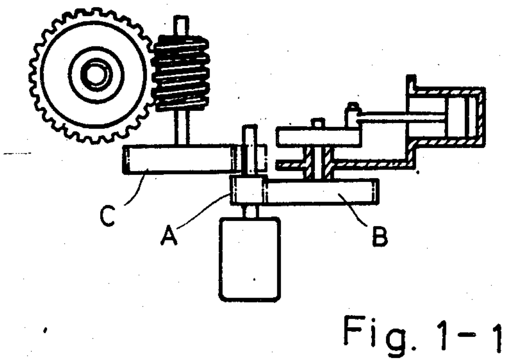
Figures 1, 2:
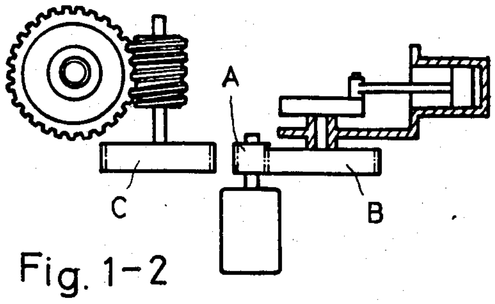

The main features of this practical application are described as follows: as shown in FIG. 1, the output shaft 102 of the drive motor 101 has a gear A for the selective coupling with the gear B to drive the air pump shaft 103. Gear may also selectively coupe with gear C on the rotary shaft 104 of the oil hydraulic pump of the spiral jack or oil hydraulic jack. The relative position among the gears groups A, B, and C achieves the coupling between the gears A and B to drive the air pump in motion and reverse rotation of the motor results in the gears A and C being coupled, whereas the motor is made to drive the jack upward and downward. The lengthway displacement changes of the gear A can be in two states,, i.e. coupling with the gear B or coupling with the gear C as shown in FIG. 1-2. Additionally, an electro-magnetic clutch 105 or mechanical clutch 106 may also be provided in the shaft of the gear B or C to achieve this purpose as shown in FIGS. 1-3A and 1-3B. Since the above-said means are so common in the machinery structures, said means are known to the skilled men of arts, no detailed repetition on it is needed here.

B. Co-axial coupling type

This is another structural way among the above-said air pump and jack drive shaft and the DC drive motor. As shown in FIGS. 2-1 to 2-6, construction shows the drive motor 210 has an elongated shaft 201 which is used to drive the piston 203 of the air pump 202 by a velocity reducing toothed wheel set 206 and 207 and which also serves as the input shaft for the jack by simultaneously driving reducing toothed wheels 206' and 207' of the jack oil pump (lifting pump). To permit the operator to operate and control the air pump and jack, the above-said structure is further provided with an operating device, so when the elongated shaft 201 is used to drive the oil pump 208, in this design, a drain back flow operating valve 205 is provided in the fluid return circuit of the outlet of air pump 202 or jack 208. The drain valve of the unit to be operated can be set at the blocked position during the operation, while drain valves of the units not to be operated will be set at the respective drain position for the operating selections, thereby determining to drive the air pump or jack.

Figures 1, 2, 3, 3A:
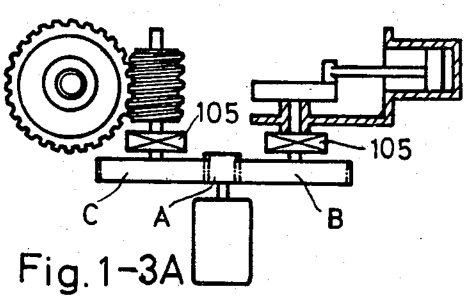
Figures 1, 2, 3:
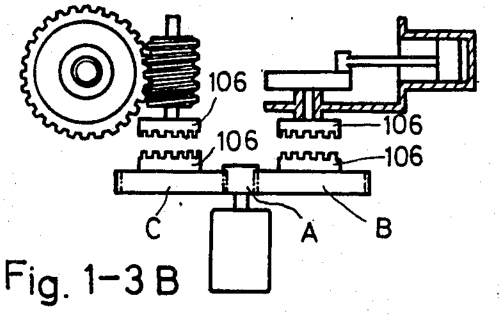

FIGS. 2-1, 2-2 and 2-3 are applicable examples of the stand type jack, as shown in FIG. 2-1. A stand type jack main body 260 is installed vertically on the based seat 261. The main body is a cylinder type oil pressure tank coupled with a stand shaft 262 which can move upward and downward under the compression. A top block 263 is installed on the upper side of the stand shaft 262 and serves as carrying working piece. A drive motor 210 with shaft 201 at its two ends is fixed transversely in the cylinder body. At one end of shaft 201 there is a small toothed wheel 206 and a bias mechanism 204 (including bias curved shaft or bias link rod moved by bias wheel which is coupled with large toothed wheel 207. In this fashion, shaft 201 can transmit the force to crank 209 and move air pump piston 203 to generate the air pump function between the piston and the air pump. The air pump has an intake opening for the air input, an exhaust opening for output of compressed air and an air channel connecting to a pressure manometer 264. The other output end shaft 201 of the motor 210 transmits the force to a small toothed wheel 206' and further moves another set of large toothed wheel 207. A bias mechanism (including bias curved shaft or bias link rod moved by bias wheel) is located at an end of the large tooth wheel 207', in which bias shaft 220 moves crank set 209'. In this fashion the forth and back pump movement function is generated by the outer tank 208 of the oil pump and the coupling movement of coupling pin 209''' and oil pump piston rod 209''. A set of drain circuit piston 205 is used for drain reduction of the jack or for the release of drain in order to show a non-drived situation. The back side of large toothed wheel has a ladder type structure with a smaller diameter, on which a set axial hole 207'' (or screw hole) is installed (formed) for inserting an operating rod, so that the driving of jack oil pump can be done by the forth and back motion with the hand.

FIG. 2-2 is a side view of the pump of FIG. 2-1.

FIG. 2-3 is another side view of the pump of FIG. 2-1.

FIGS. 2-4, 2-5 and 2-6 are applicable examples of this coaxially-coupled floor type jack, in which its structure is same as the traditional floor type jack. A wheel shaft 272 and wheel 273 are installed on the one side of the floor type machine body and a wheel 273 is installed on the other side for motion driving. A drive rod 281 is driven by a active oil pressure tank 280 which is coupled with a risen arm set 274 using the coupling pin 276. The risen arm set 274 is coupled with two openings on the upper side of the machine body 271 using a set of penetrating rod 275, and it acts as the center of the oscillation to accept the driving of the drive rod 281 to move the upper arm 277 coupled with another coupling pin 278 at its other end for the upward or downward motion of the supporting block 279. Its main characters include: a common drive motor 210 with an elongated double-ended shaft 201 having two ends. Its one end has a small toothed wheel 206 and a bias mechanism 204 (including bias curred shaft or bias link rod moved by bias wheel) coupled with large toothed wheel 207, thus it can move the crank 209 and then air pump piston 203 to generate the air pump function between the piston and the air pump. The air pump has an intake opening for air input, an exhaust opening for output of compressed air and an air channel connecting to a pressure manometer 264. The other end of shaft 201 of motor 210 moves a small umbrella toothed wheel 206' and then a large toothed wheel with the disc type side teeth 207'''. The bias mechanism (including bias curved shaft or bias link rod moved by bias wheel) is located at the end of the large toothed wheel. The crank 220' and the forth and back pump motion function is generated by the outer tank 208 of the oil pump and the coupling motion of the coupling pin 209''' and oil pump piston rod 209''. A drain circuit pin 205 is used for the drain in order to return the jack to a non-driven position. The back side of large toothed wheel has a ladder type structure with a small diameter, on which at least a set of axial hole 207'' (or screw hole) is installed for inserting an operating rod, so that, if desired, the driving of the jack oil pump can be also done by the forth and back motion with the hand.

Another example of the above-said co-axially-coupled jack is shown in FIG. 2-7, in which the mechanical type clutch operating and controlling method conducts the operating selections on the air pump of the jack. In the example shown in FIG. 2-7, its constructions is described as follows:

an air pump 202 directly couples with the rear side of the drive motor 210 or it has a pull/push or rotary movable mechanical structure to make the air pump 202 engage or disengage (as the case may be) with the motor 210.

The front shaft of a positively or reversely driven motor 210 is in an elongated shaped shaft and is in a terraced rod (stepped down) shape 211 with a slightly smaller diameter. The diameter of the front section of rod 211 is largest the middle section of the said terraced rod 211 has an axial key slot 212 and its end section has threads 213 the end of its smaller terraced rod also has lock opening 214. The end of the elongated shaft close to the motor has an annular slot 216 to receive therein a limiting snap ring 215.

A worm rod 216 with a smooth round hole aperture inside couples with the drive female worm gear 217 of the spiral jack, its one end close to the motor is flat and smooth, while its other end has a tooth-shaped surface 218 for coupling transmission and its center has a hole 219 with a slightly inward recess;

A ring-shaped spring 220 is positioned in the said recess hole 219.

An annular structure to couple with the tooth-shaped surface 218 of the above said worm rod 216 for the transmission coupling has a round hole 221 in its center. To couple with the tooth-shaped surface 218 of the worm rod 216 for coupling transmission the annular structure has an opposite and complementary tooth-shaped structure 222 and a recess shaped hole 223 which receives the above-said ring spring 220. The annular structure also has an axial key slot 224. An elongated strip shaped key slot 225 is to be set into a place between the above-said key slot 224 and the key slot 212 of the shaft 211 to make both of them mutually conduct the transmission. This transmission coupling annular structure make the annular structure. First tightly press against the ring-shaped spring 220 when the annular structure is pushed by an external force and then couple with the coupling tooth 218 on the side face of the worm rod for transmission. When the tightly pressing external force is stopped, the ring-shaped structure is biased away by the spring 220.

An operating ring 226 having internal threads formed therein couples with the threads 213 on the end of the terraced rod 211 with a larger diameter on the front section of the elongated shaft, the tightly screwing of the ring 226 onto the threads 213 forces the transmission coupling annular structure to engage the worm rod and also the release thereon, thereby making both of them biased apart by the ring-shaped spring 220 for separation.

An auxiliary knob 227 uses a fixed pin 228 which is inserted into the pin hole 214 of the end of smaller diameter of the elongated shaft of the motor for manually fixing the knob 227 to the motor shaft in order to convenience the operation, when the above said operating ring is rotated.

To join the above-said structure, we can conduct the following operations:

To tightly screw the operating ring, one tightly presses the coupling ring and the worm rod, thereby making them driven by the motor into motion. This, in turn drives the female worm gear with the threads inside to drive the screw of the spiral-type jack for either lifting or lowering the jack.

To release the operating ring, one separates the coupling ring and the screw separated and thus prevents the jack structure from being driven by the motor into motion.

If the relationship between the air pump and the motor is of the direct coupling, it is constantly driven by the motor since the required horse power is constantly smaller than that of the jack. In this case when the air pump is used concurrently with the jack it will not adversely affect the driving over the jack. If it is necessary to conduct the clutch actions, it can conduct the clutch action and add usual mechanic or electro-magnetic clutch according to the needs.

While FIG. 2-7 shows its structure used for the drive of shear jack, its applicable example are shown in FIGS. 2-8, 2-9 and 2-10. In these figures the based seat 280 is used for installation of 4 sets of supporting arms 281 on it. The lower parts of the supporting set is coupled with the based seat using coupling pin 282. The upper parts of the supporting set are also coupled with the supporting plate using a coupling pin 282. Its two ends are coupled using screw hole pin 285 for the penetration of screw rod 216'. The chute 289 on the guide rod is limited by the coupling pin 288 of penetrated hole 287 with the limited pin 286. Thus, the guide rod 216' is limited for its rotation. The relationship of the guide rod and coupling pin 288 with the penetrated hole 287 is the rotation in the original position, so that when the screw hole pin 285 is threadably engaged by the guide rod 216' and is moved driving the supporting arm 281 upwardly and downwardly and carrying with it the upper supporting plate for upward and downward motion.

The above-said various air pump and oil pump devices are applicable to the conventional oil hydraulic jacks and, using a common drive motor, can be further separate from the jack bodies as shown in FIG. 3. In this fashion the pumps may be used to conveniently meet the requirements of the special places, and can be used in various designs and uses.

Figures 1, 2:
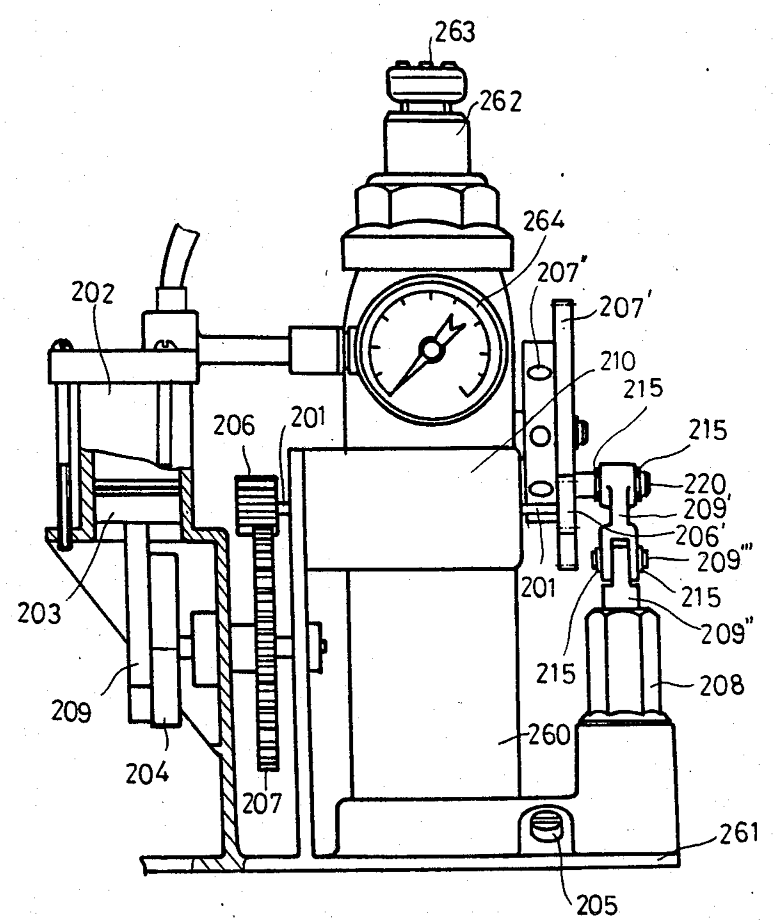
Figure 2:
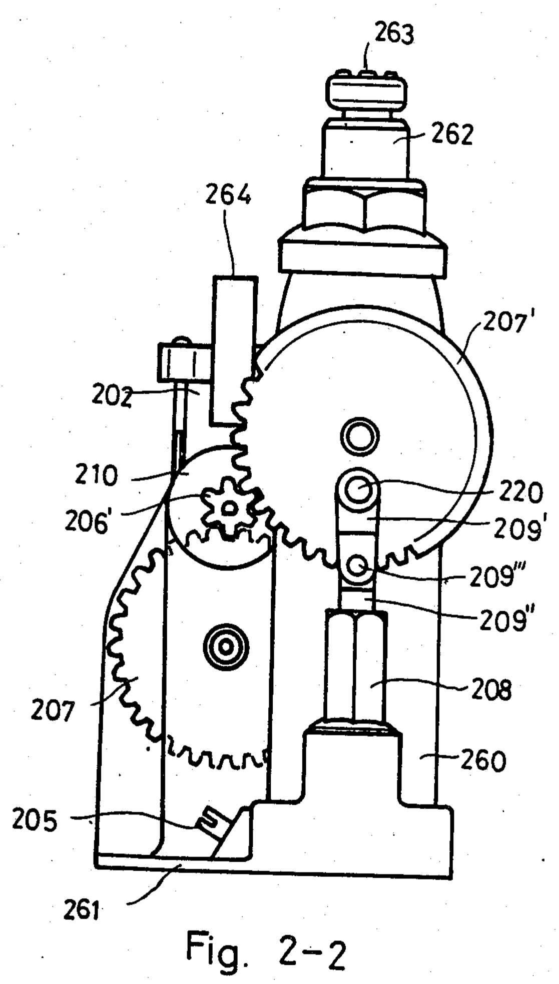
Figures 2, 3:
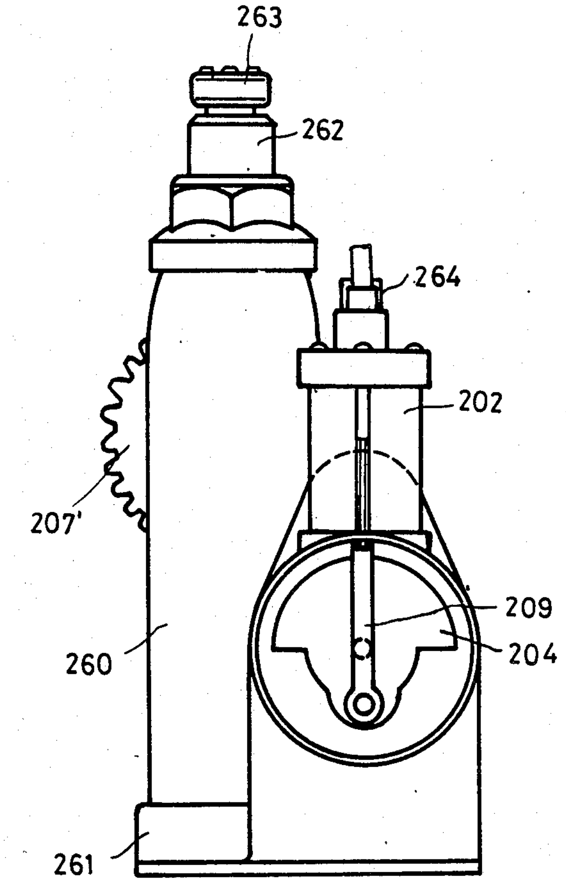
Figures 2, 3, 4:
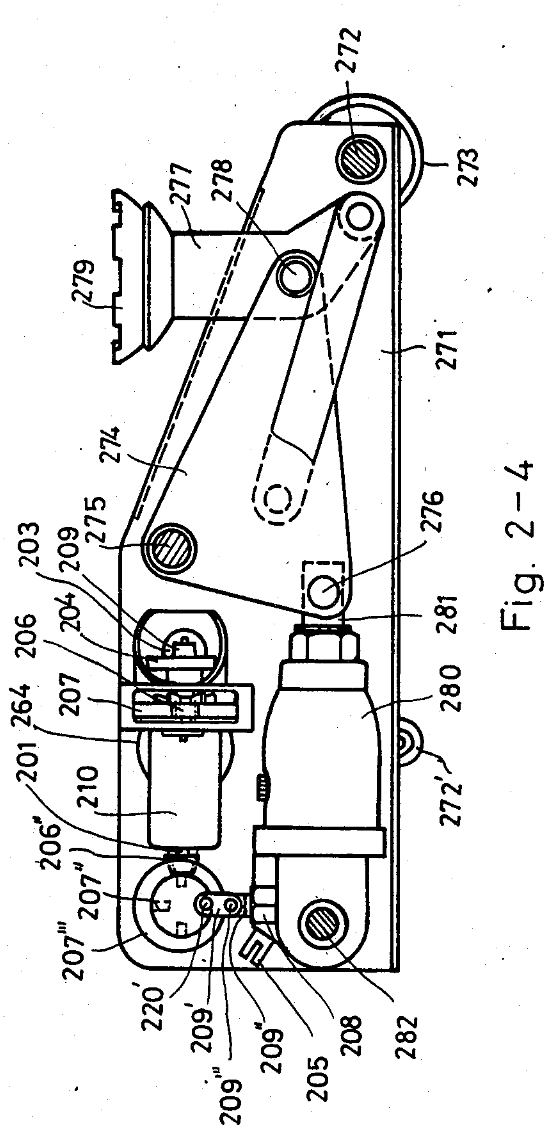
Figures 2, 3, 4, 5:
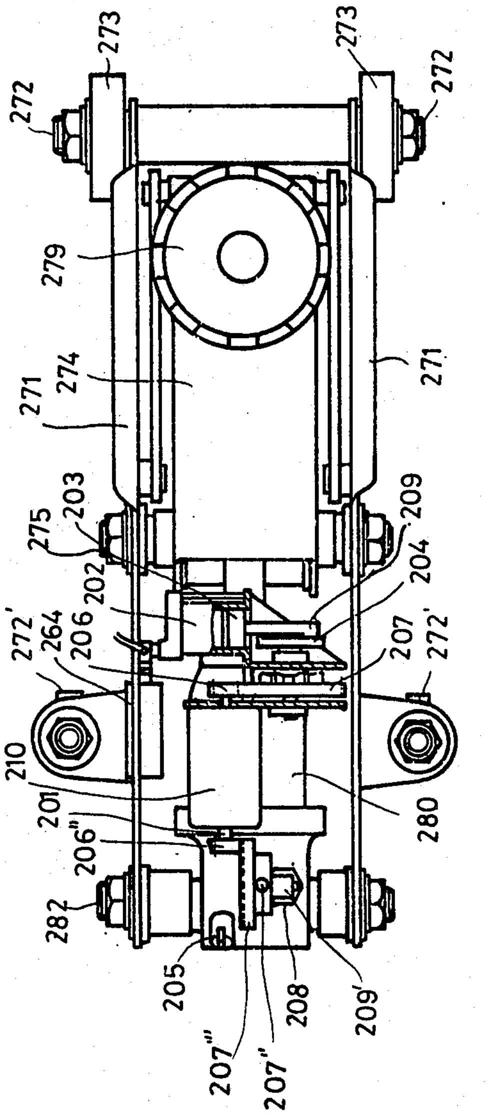
Figures 2, 3, 4, 5, 6:
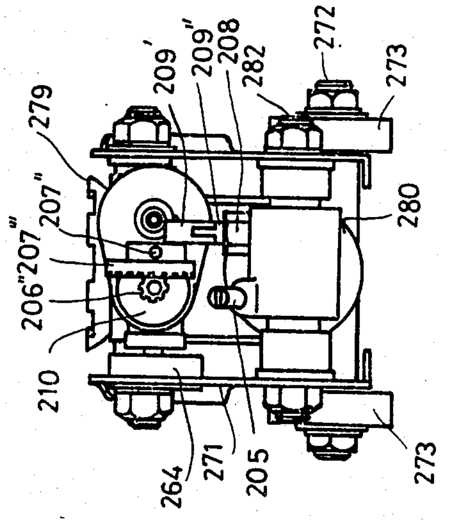
Figures 2, 3, 4, 5, 6, 7:
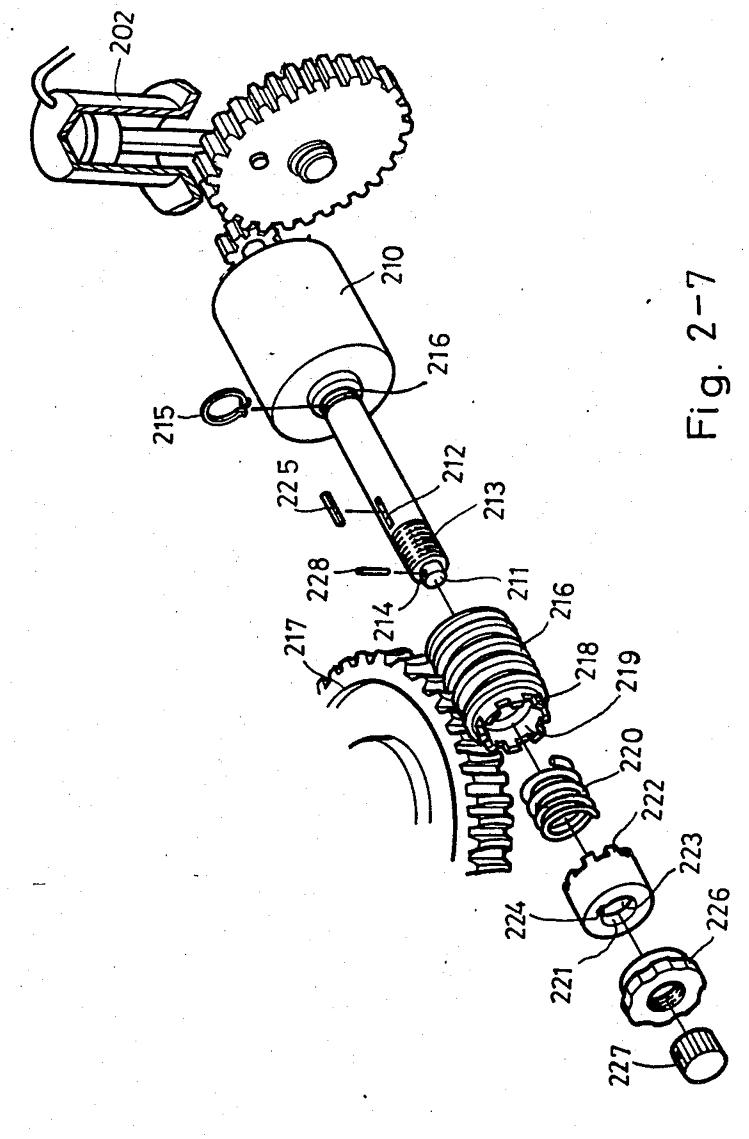
Figures 2, 3, 4, 5, 6, 7, 8:
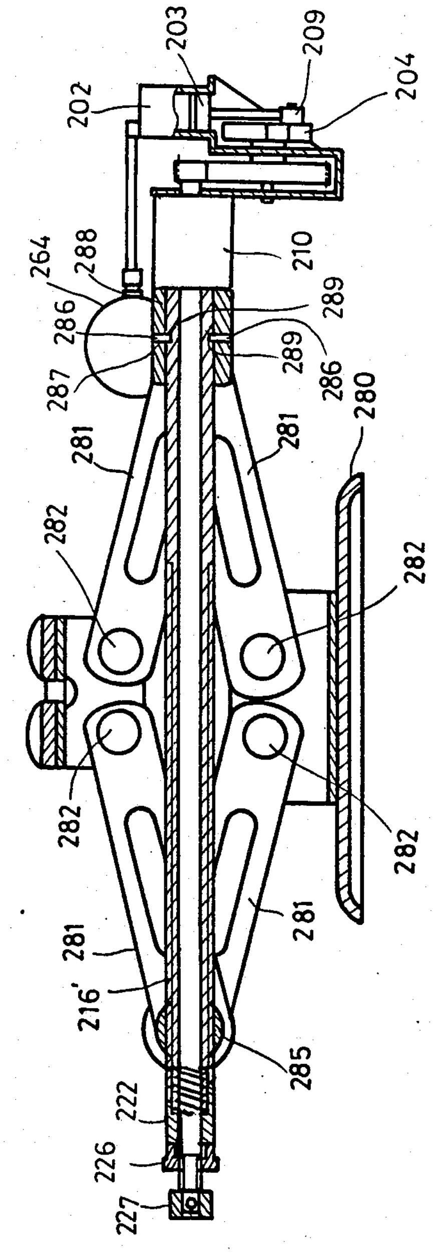
Figures 2, 3, 4, 5, 6, 7, 8, 9:
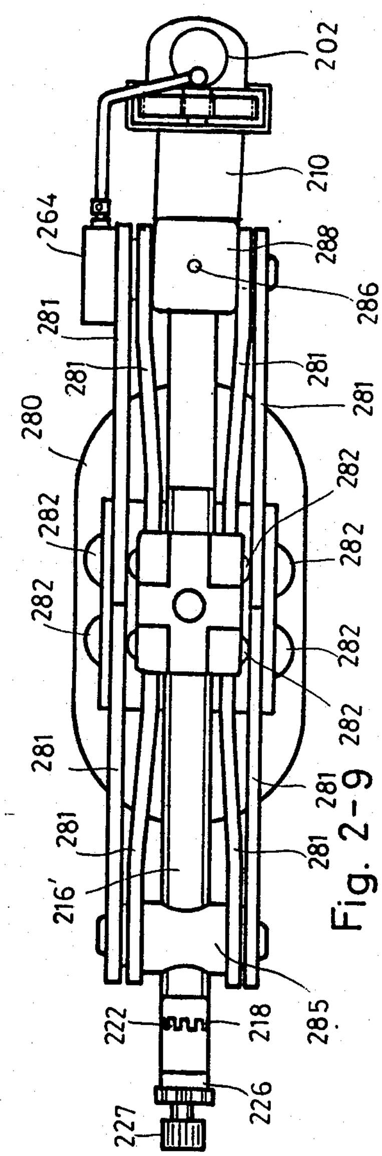
Figures 2, 3, 4, 5, 6, 7, 8, 9, 10:
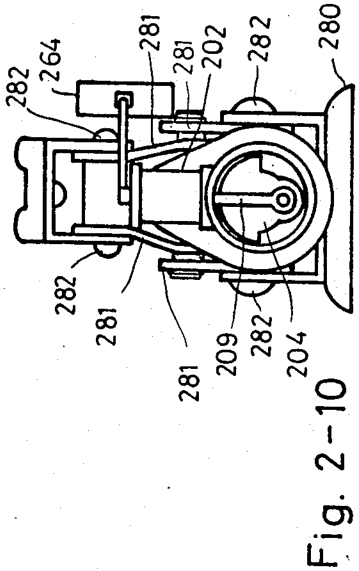
Figure 3:
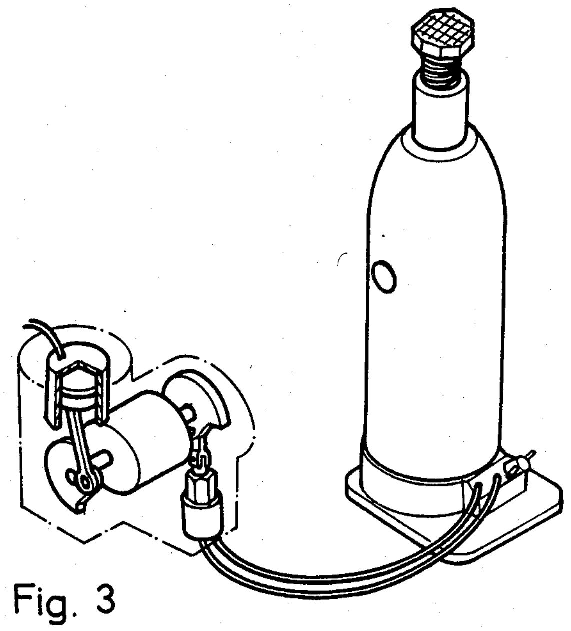
Figure 4:
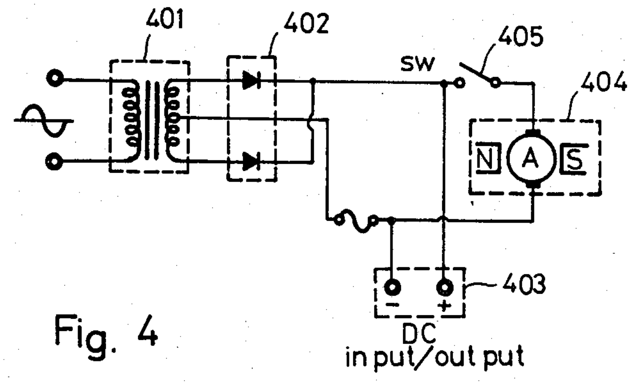

The above-said various compound structures can be further made to use both AC/DC power using circuitry as shown in FIG. 4. Its feature lies in that inside the base, a transformer 401 is provided to transform the household power supply into a low voltage output. Its low voltage output end is connected to a rectifier 402 for the low voltage output. Its output end can also be connected in parallel to the socket 403 on the above-said DC input end to drive the above-said DC motor 404 for driving the air pump or jack into motion. This input socket 403 can make the DC output to act as a charger. Alternatively an output terminal is added to serve as a charger, thereby further making the invention become a tri-functional compound tool form. In this structure, a switch 405 is connected in series with the input end of the DC motor 404 to cut off the DC motor 404, when it serves as a charging power supply.

The above-said various descriptions and examples provide the compound device of the air pump and the jack using a common motor.

What is claimed is:

1. In a hydraulic floor jack adapted for the tasks of lifting a vehicle and pumping up a tire, respectively, the combination of a housing, a common drive motor in the housing, the motor including an elongated double-ended shaft having respective end portions projecting from the motor, an air pump on the housing and including a piston connected to one of the end portions of the motor shaft, reduction gearing driven by the other end portion of the motor shaft, an oil pump including a crank driven by the reduction gearing, an oil pressure tank driven by the oil pump and including a drive rod, a lifting mechanism including a pivoted arm set driven by the drive rod, a pivoted upper arm coupled to the arm set and including a supporting block for lifting a vehicle, and drain control means for the air pump and oil pump, respectively.

* * * * *